Aug. 23, 1966   A. J. GASS ETAL   3,268,116
APPARATUS FOR DENESTING FLEXIBLE CONTAINERS BY SUCTION MEANS
Filed Nov. 10, 1964   6 Sheets-Sheet 1

INVENTORS
A. J. GASS
H. W. BAER
BY
Young r Quigg
ATTORNEYS

INVENTORS
A. J. GASS
H. W. BAER
ATTORNEYS

Aug. 23, 1966   A. J. GASS ETAL   3,268,116
APPARATUS FOR DENESTING FLEXIBLE CONTAINERS BY SUCTION MEANS
Filed Nov. 10, 1964   6 Sheets-Sheet 6

INVENTORS
A. J. GASS
H. W. BAER
BY
ATTORNEYS

United States Patent Office 3,268,116
Patented August 23, 1966

3,268,116
APPARATUS FOR DENESTING FLEXIBLE CONTAINERS BY SUCTION MEANS
Andrew J. Gass and Herman W. Baer, Orangeburg, N.Y., assignors to Phillips Petroleum Company, a corporation of Delaware
Filed Nov. 10, 1964, Ser. No. 410,230
5 Claims. (Cl. 221—40)

This invention relates to a method for separating a container from a stack of similar nested containers. In one aspect, it relates to a high-speed de-nesting operation wherein a nested stack of containers is fed to a conveyor by peeling off the bottom container in a stack of nested containers using suction cups and dropping said container onto a conveyor. In a still further aspect, the invention relates to a method for feeding a flexible, open-top container from a substantially vertical nested stack of such containers onto a conveyor, the method comprising supporting the bottom container in said nested stack on opposite sides, attaching suction cups on opposite sides of said bottom container, the sides to which the suction cups are attached being different from the sides being supported, moving said suction cups slightly outwardly then inwardly insuring the release of any grip said bottom container may have on the stack of containers, pulling said suction cups downwardly to strip said last container from said stack of containers, releasing the suction in said suction cups, withdrawing said suction cups and allowing said container to drop freely onto a conveyor. In a still further aspect of the invention, there is provided an apparatus for de-nesting a stack of containers comprising a means for holding said containers in a stacked vertical position, means for contacting opposite walls of a container with suctions cups, means for drawing a vacuum on said suction cups, means for moving said contacting means outwardly then inwardly, means for moving said suction cups downwardly, means for releasing said vacuum in said suction cups, means for withdrawing said means for contacting said container with said suction cups.

In the mechanized packaging of certain material, problems have been encountered in the feeding of containers to the mechanization operation. In order to insure a fast and efficient operation, the containers to be used must be fed onto a conveyor at a rapid rate. Nested containers have posed some problems in that they are sometimes difficult to separate at rapid feeding rates of, for example, 150 containers per minute. In certain instances, more than one container would be fed into a pocket in the conveyor and, in other instances, no containers would be fed onto the conveyor. A profitable operation requires that the nested containers be fed into the operation at a rapid rate and with no errors. For this purpose, many devices have been invented. One of the more popular types of feeding containers has employed the use of suction cups. The suction cups grip the container, separate the container from the stack and deliver the container to a specified pocket. Despite improved results, the requirements for efficient operation were not met. Some devices attach suction cups to the bottom of the container. Others attach suction cups to the inside of inverted containers. Both of these methods were found to be unsatisfactory for use in de-nesting flexible containers. In the case of the bottom-attached suction cups, more than one container would be drawn off at one time, and in the device wherein the suction cups which attached to the inner walls of an inverted container, the operation was too slow and too cumbersome to provide efficient operation. In the latter case, the containers had to be inverted before being fed to the operation.

We have now found that an efficient and rapid separation of nested containers can be accomplished if suction cups are attached to the outer sides of a nested stack of containers, each container is peeled from the nested stack by moving the suction cups downwardly, and the container is then released.

Accordingly, it is an object of this invention to provide a method for de-nesting containers for use in a mechanized operation. It is a further object to feed stacked, nested containers to a conveyor. It is a still further object of this invention to provide an apparatus to carry out the process of this invention.

Other aspects, objects, and the several advantages of the invention are apparent from a study of the specification, drawings, and the appended claims.

According to the invention, there is provided a method and apparatus for de-nesting a stack of containers, the method comprising applying suction cups to the outer walls of the bottom container in a nested stack of such containers, applying a suction to the suction cups to attach the suction cups to the walls of the container, moving the suction cups downwardly to strip the container from the nested stack of containers, releasing the vacuum in the suction cups and withdrawing the suction cups from the sides of the container, thus allowing the container to fall freely into any desired slot or pocket. Further according to the invention, after the suction cups contact the outer walls of the container and the vacuum is applied, they reciprocate or move outwardly then inwardly slightly to insure release of the bottom container from the stack of containers. The method and apparatus of the invention can best be understood by reference to the accompanying drawings.

Figure 1:
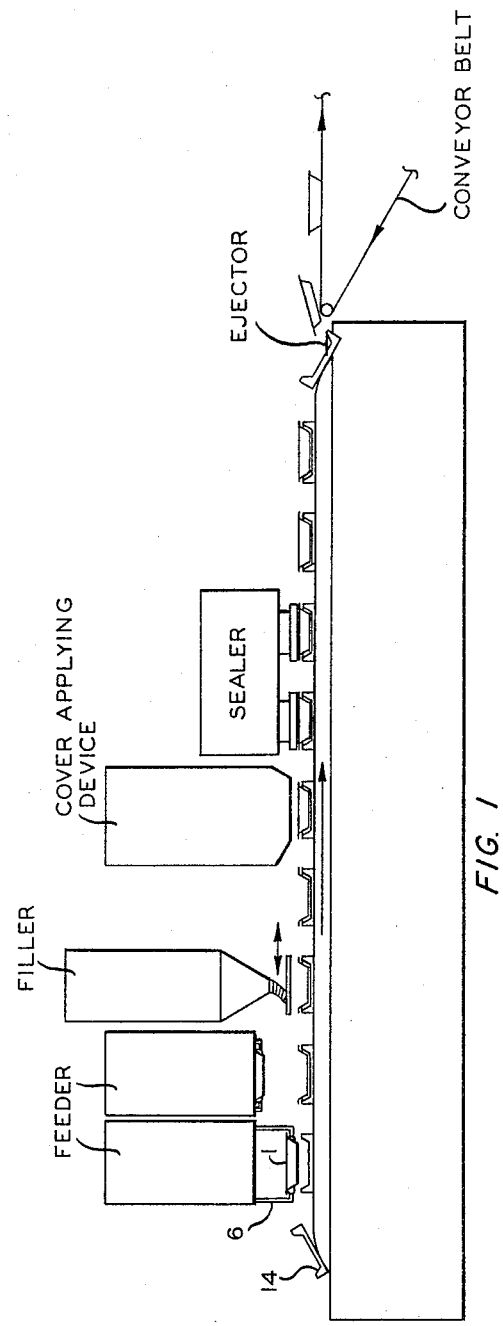
FIGURE 1 is a schematic drawing of an integrated container filling and cover sealing operation in which the invention is designed to be placed.

Referring now to the drawings, FIGURE 1 shows a series of operations in which a container feeder or de-nester supplies containers to a conveyor, the containers are transported to a filling station wherein the containers are filled with a product, and the filled containers are transported to a station at which covers are applied, then to a sealing station where the covers are sealed on to the containers and finally the containers are ejected from the conveyor onto a conveyor belt which carries them away. As is shown in the drawings, a plurality of de-nesters can be used. Each can be used to fill every other slot on the conveyor. In such a manner, a fast operation can be carried out.

Referring now to FIGURES 1 through 6, the container to be de-nested is generally denoted by 1, the sides 2 of the container are gripped at opposite ends by suction cups 4. A stack of containers 1 are held in a magazine-type arrangement by stack-holders 12 and 13. Support members 7 on the bottom of stackholder 13 support the bottom container under a flange 3. In this embodiment of the invention, the container is shown with an outer flange or lip 3 and with four sides. However, it is contemplated that there need be no flange 3 and the container may have more or less sides than shown in the figure. For example, the container may even be round. Suction lines 5 are attached to suction cups 4, which are held on arms 6. Arms 6, biased in closed position by spring 10, are pivoted at 8 so that horizontal motion may be imparted to arms 6 and in turn to the suction cups on member 6. Actuation of horizontal motion of arms 6 is by cams 15 which contact bearing 11 attached to member 6. Pivots 8 are attached to T-shaped member 9 which is pivoted at 16 and engages cam 18 at attached bearing surface 17. A vertical motion is imparted to arms 6 by cam 18. As can be seen in the drawings, specifically FIGURE 6, the T-shaped member 9 is so balanced at point 16 that arms 6, if unrestrained, are turned to move downwardly. Cam 18 in a sense restricts the downward movement of arms 6. If desirable, a spring 40 can be provided to maintain bearing surface 17 biased against cam 18. When the bearing surface 17 is contacting section 18' of cam 18, the arms will be in the down position. When bearing surface 17 is contacting section 18" of cam 18, the arms will be in the up position. Cam 18 is supported by shaft 19, which, in turn, is supported by the frame.

T-shaped member 9 is connected to support member 20 which is attached to the frame so as to be fixed in place.

Power is supplied to shaft 19 through sprocket 21, chain 22, and sprocket 23, which rotates with shaft 24. Power can be supplied directly to shaft 24 by an electric motor, gasoline engine, or the like.

Bevel gears 25 take power from shaft 19 and transfer the same to cams 15 through shaft 26, sprocket 27, chain 28, sprocket 29, and shaft 30, which is anchored to the frame.

The vacuum system is controlled by vacuum control valve 31. The switch for valve 31 is actuated by movement of cam follower 32 following the contour of cam 33 attached to shaft 19. Valve 31 is supported by member 34 and attached to the top of the frame.

Figure 7:
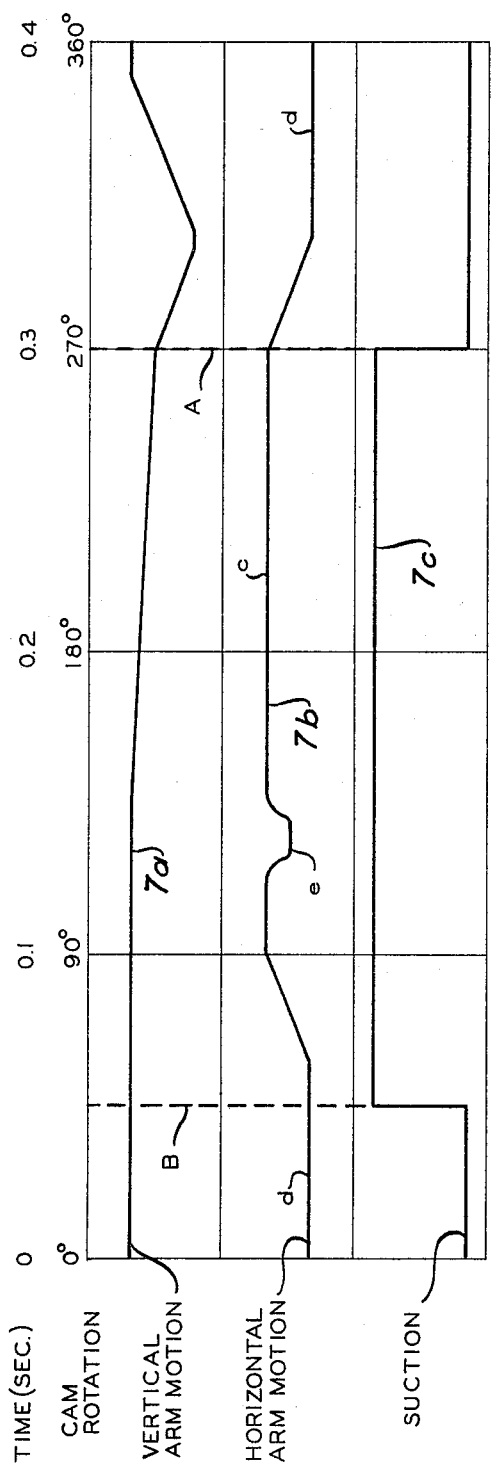
FIGURE 7 shows time-displacement diagrams of the three cams used in the apparatus of the invention.

In FIGURE 7, the three diagrams represent graphically the relationship between displacement of the three cams and time. The cycle shown is that in which shaft 19 turns 360°. 7a shows a graph representative of the motion imparted by cam 18; 7b shows a graph representative of the motion imparted by cam 15; 7c shows a graph representative of the motion imparted by cam 33. In other words, the graph 7a represents the vertical movement of arms 6, 7b represents the lateral or horizontal movement of arms 6, and 7c represents the vacuum valving operation. Dotted line A indicates that point of time when the vacuum is released and dotted line B indicates when the vacuum is reapplied. The dip of graph 7a indicates that period of time when the arms 6 are in the down position and the upper part indicates that point of time when the arms 6 are in the upper position. Level "c" of 7b indicates that portion of time when the arm ends are in the inward or closed position, level "d" indicates that portion of time when the arm ends are in the outward or open position, and level "e" indicates that period of time when the arms bump outwardly to help disengage the bottom container from the stack. That period of time between lines B and A indicates the time for which the vacuum is applied.

Figure 2:
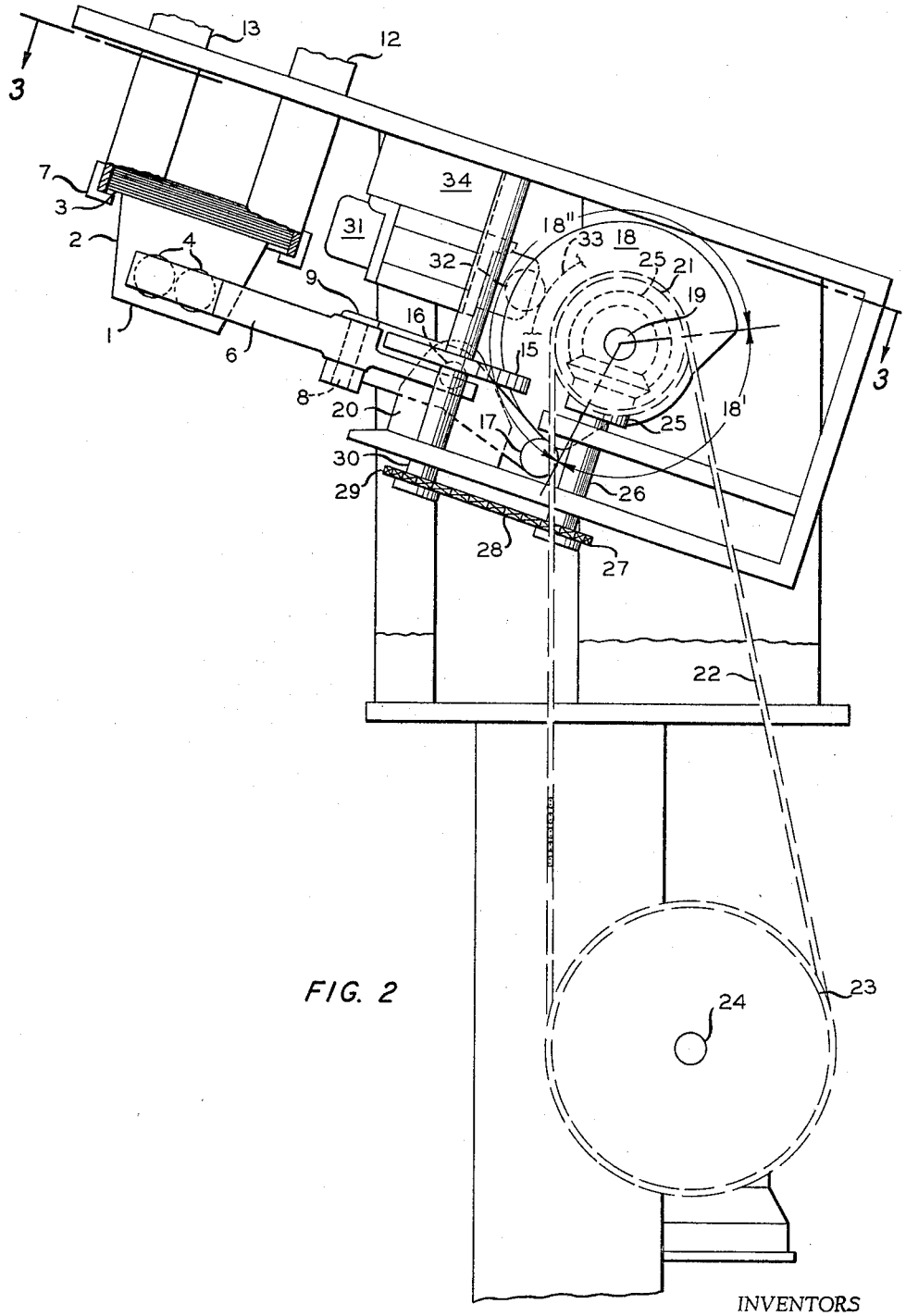
FIGURE 2 is a side view of the apparatus of the invention without the housing.
Figure 3:
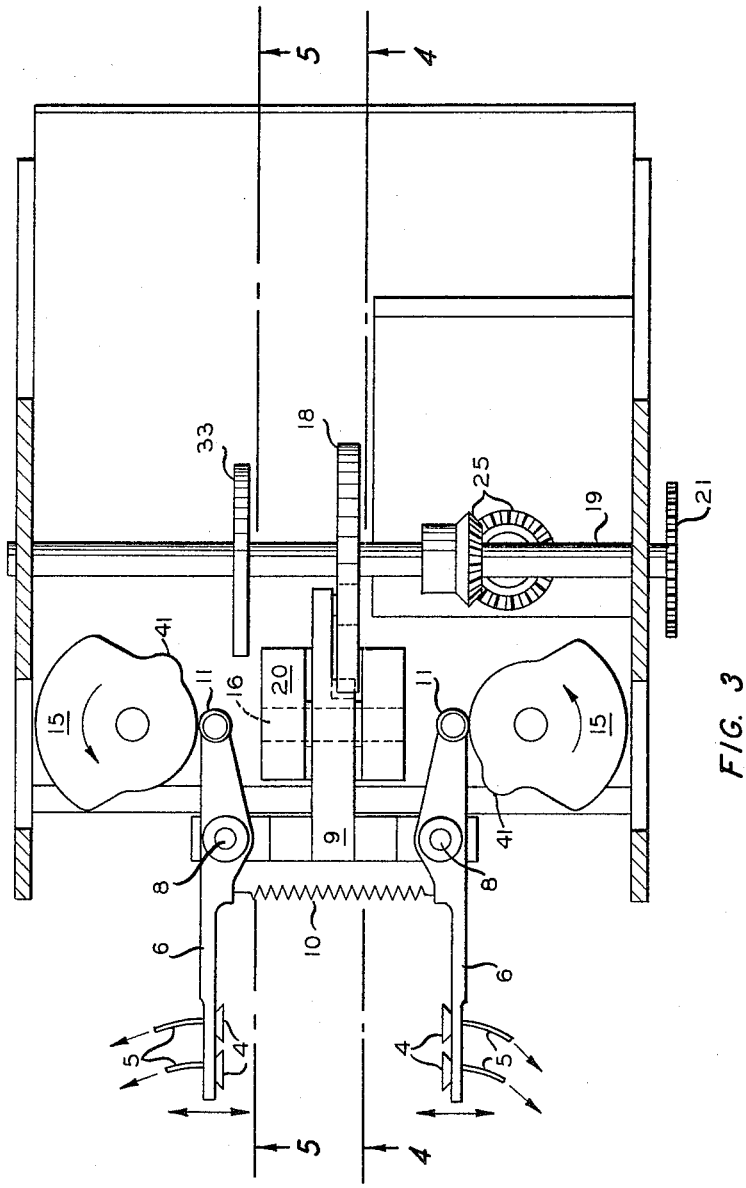
FIGURE 3 is a top view section taken along line 3—3 of FIGURE 2.
Figure 4:
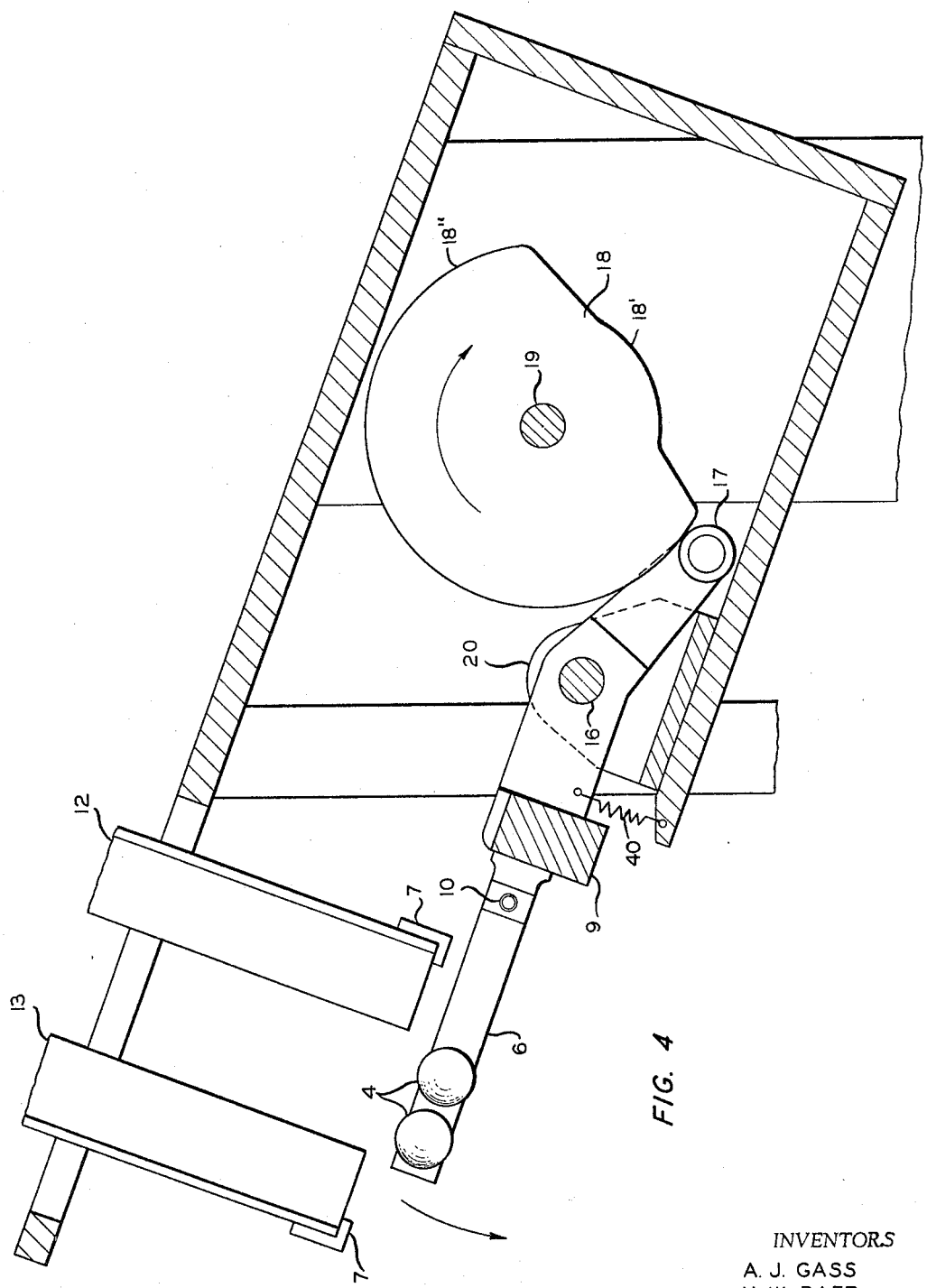
FIGURE 4 is a partial section taken through line 4—4 of FIGURE 3.
Figure 5:
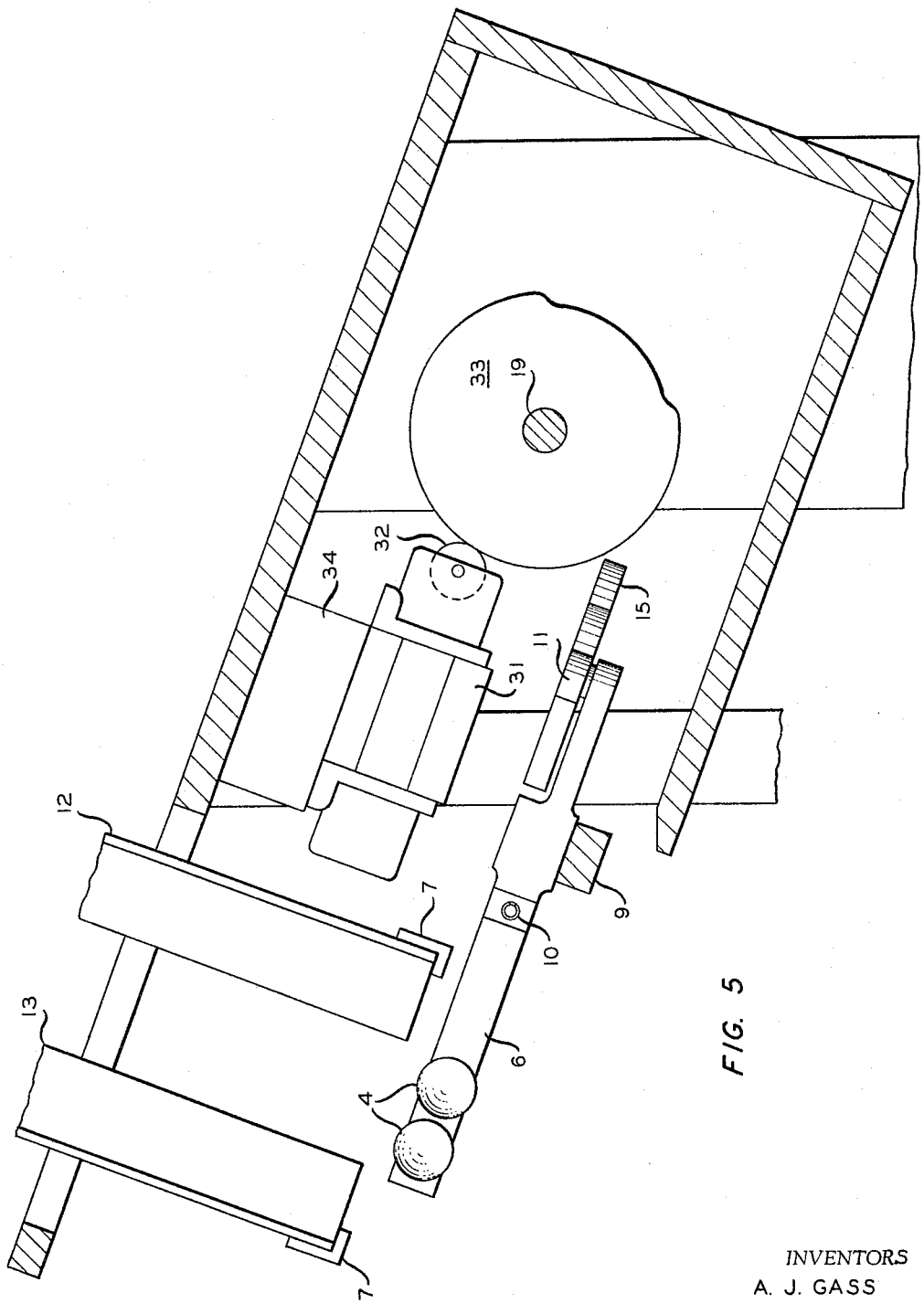
FIGURE 5 is a partial section taken through line 5—5 of FIGURE 3, showing the vacuum control actuation mechanism.
Figure 6:
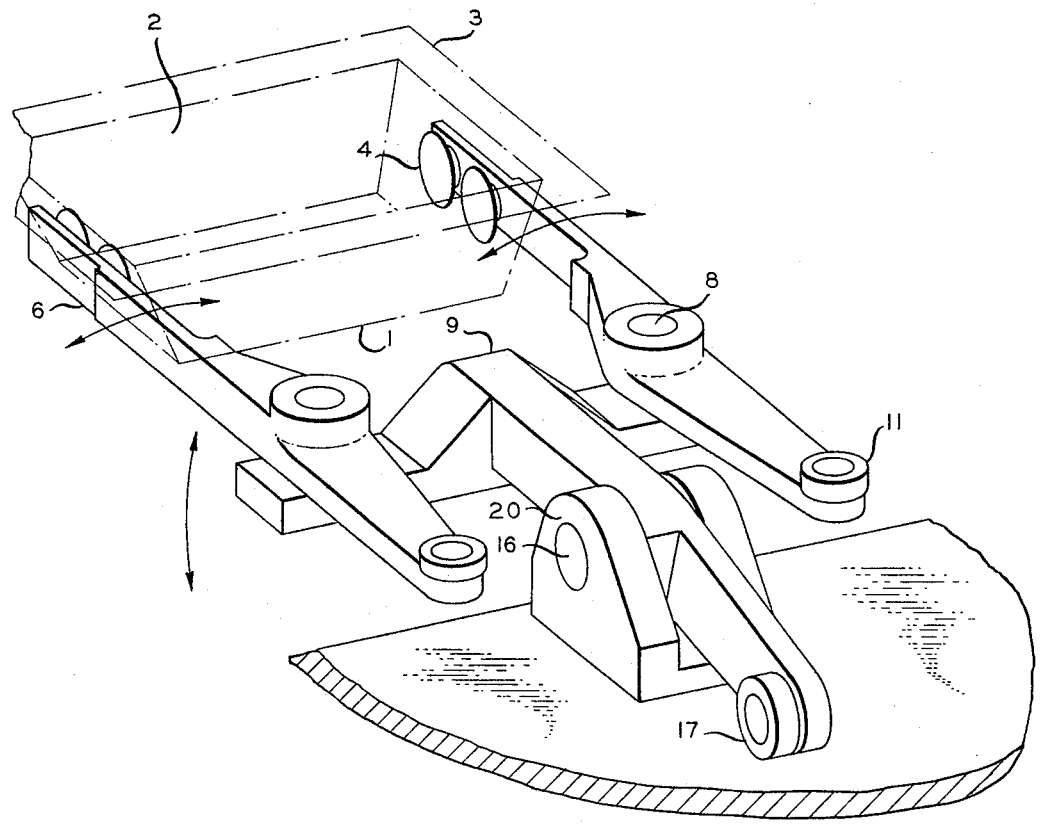
FIGURE 6 is a schematic isometric drawing showing just the container, arms, supporting T-member, pivot, and support member.

In operation, containers will be stacked as shown in FIGURE 2. Arms 6 will pivot about pin 8 so that suction cups 4 contact container walls at opposite sides. Valve controller 31 is actuated through cam follower 32 by cam 33. A vacuum is drawn through lines 5 on suction cups 4, thus adhering the walls of the containers to member 6. Cam 15 moves arms 6 outwardly then inwardly as cam follower 11 moves over bump 41 of cam 15. A slight flexing of the container results. This causes the sides 2 which are held by stack-holder 13 to be flexed so that it will be easier to remove the container from the stack. As the suction cup 4 contacts the bottom container and suction is applied, the arms 6 are in a position about 90° earlier than that shown in FIGURE 3. As the cams 15 continue to rotate, cam follower 11 is bumped toward the center by the small bump 41 on cam 15, thus causing arms 6 to be bumped outwardly. This corresponds with point e on line d of FIGURE 7. As the cam 15 continues to rotate, the cam follower 11 will roll down and off the small bump, thus causing arms 6 to move in towards the center again. The bump outwardly of the arms 6 causes the container to flex inwardly on those walls which do not have the suction cups attached thereto, these walls being on the sides at which the bottom container is held by the stack holder 7 as can be seen in FIGURE 2. This outward movement of arms 6 not only insures that suction cups 4 are firmly attached to the walls of the container, but helps to dislodge the container by causing the walls containing the flanges at which the container is held to be flexed inwardly. Further, the flexing of the bottom container separates the bottom container from the second container in the stack (at least in the point at which the walls are flexed), thereby breaking a vacuum between the bottom container and the second container whereby air can pass between the two containers, thus allowing an easier withdrawal of the bottom container. Referring to FIGURE 7, it can be seen that the vertical arm begins to move in a downward direction directly after the bump at e. This downward action of arms 6 in combination with the bumping movement of arms 6 provides a rapid separation of the bottom containers in the stack. Cam follower 17 on T-member 9 follows cam 18 into region 18', thus pivoting T-member 9 in a counterclockwise direction, causing arms 6 with container 1 attached to move downwardly. When the container has been pulled downward a short distance, it will be free from the stack. The downward position for the container 1 corresponds to dotted line A in FIGURE 7. At this point, cam 33 actuates valve controller 31 through cam follower 32 and the vacuum is released. The container 1 falls freely into pocket 14 (FIG. 1) on a moving conveyor. At this time, cam 15 pushes arms 6 apart to allow the container to fall freely. Cam 18 then actuates T-member 9 to rotate it in the clockwise direction, causing arms 6 to move upward to the engaging position. Cam 15 actuates arms 6 to move into the closed position and the cycle begins again.

It is obvious from the disclosure and drawings that the speed of the operation depends upon the speed of shaft 19. Successful operations have been performed at a speed of 150 cycles per minute.

Reasonable variation and modification are possible within the scope of the foregoing specification, the drawings, and the appended claims to the invention, the essence of which is that articles are de-nested by positioning suction cups on the outer side of a bottom container in a stack of nested containers, applying suction to the suction cups thus adhering the suction cups to the outer portion of the container, moving the suction cups slightly outwardly then inwardly, moving the suction cups downwardly to strip said container from said stack of containers, releasing the suction in the suction cups and withdrawing the suction cups from the sides of the container, thus allowing the container to fall freely into a desired position.

We claim:

1. An apparatus for denesting a stack of flexible, open-top containers, each container having a bottom and a continuous side wall, said apparatus comprising:
   (a) means for holding said stack of flexible containers in a vertical position, open end up;
   (b) means for supporting the bottom container on two opposite sides of said container;
   (c) suction means;
   (d) means for moving said suction means to the outer surface of said side walls of said bottom container;
   (e) means for drawing a vacuum on said suction means to thereby attach said suction means to said outer surface;

(f) means for moving outwardly and inwardly said suction means thus pulling said outer surface of said side walls of said bottom container outwardly and then inwardly;

(g) means for moving upwardly and downwardly said suction means;

(h) means for releasing said vacuum; and (i) means for withdrawing said suction means from said bottom container.

2. An apparatus for feeding a stack of flexible open-top containers, each container having a bottom and a continuous side wall, said containers being fed one-by-one onto a conveyor, said apparatus comprising:

(a) at least two support members which keep a stack of flexible containers in substantially vertical position, said support members having means for engaging two opposite sides of the bottom container in said stack;

(b) suction cups which attach to opposite outer surfaces of said container side wall different from those to which said support members are engaged;

(c) means for drawing a vacuum on said suction cups to enable said suction cups to grip said outer surfaces of said container side wall;

(d) a horizontally pivotable member attached to each of said suction cups;

(e) a first cam means which actuates the horizontal movement of each of said pivotable members to move said suction cups outwardly and inwardly;

(f) means to actuate said first cam means;

(g) a T-shaped member which supports said pivotable members being attached thereto on opposite sides of the top ends of said T member;

(h) a shaft about which said T member is pivotable in a vertical plane;

(i) a second cam means which actuates vertical movement of said T member;

(j) means to bias said T member against said second cam to permit said suction means to move upwardly and downwardly to pull said bottom container from said stack, said second cam means being supported on and actuated by a shaft through which power is supplied; and (k) means to release said vacuum means when said suction cups have pulled said bottom container from said stack.

3. An apparatus according to claim 2 wherein there is provided a power takeoff means from said shaft and a means for transferring power from said power takeoff means to said first cam means.

4. An apparatus according to claim 2 wherein there is provided a third cam means, said third cam means being attached to said power shaft, a vacuum control valve which controls the application and release of vacuum to said suction cups, and means for using the contour of said third cam means to actuate said vacuum control valve.

5. Apparatus according to claim 4 wherein said first cam means, said second cam means, and said third cam means all rotate at the same speed.

References Cited by the Examiner

UNITED STATES PATENTS

| 1,472,584 | 10/1923 | Carle | 221—40 |
| 1,905,046 | 4/1933 | Nicolai et al. | 221—210 |
| 1,942,885 | 1/1934 | Tevander | 221—211 |
| 2,788,155 | 4/1957 | Martin | 221—211 |
| 3,083,868 | 4/1963 | Mueller | 221—221 |
| 3,090,523 | 5/1963 | Packman | 221—36 |
| 3,091,362 | 5/1963 | Robinson | 221—36 |

ROBERT B. REEVES, *Primary Examiner.*

WALTER SOBIN, *Examiner.*